United States Patent
Ikenohata

(10) Patent No.: US 9,221,419 B2
(45) Date of Patent: Dec. 29, 2015

(54) HEAD PROTECTION AIRBAG APPARATUS

(71) Applicant: TOYODA GOSEI CO., LTD., Kiyosu-shi, Aichi-ken (JP)

(72) Inventor: Sho Ikenohata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/518,047

(22) Filed: Oct. 20, 2014

(65) Prior Publication Data

US 2015/0115582 A1 Apr. 30, 2015

(30) Foreign Application Priority Data

Oct. 30, 2013 (JP) .................................. 2013-225696

(51) Int. Cl.
| | |
|---|---|
| *B60R 21/237* | (2006.01) |
| *B60R 21/232* | (2011.01) |
| *B60R 21/00* | (2006.01) |

(52) U.S. Cl.
CPC .............. *B60R 21/237* (2013.01); *B60R 21/232* (2013.01); *B60R 2021/0048* (2013.01)

(58) Field of Classification Search
CPC ................ B60R 21/237; B60R 21/232; B60R 2021/0048
USPC ..................................................... 280/730.2
See application file for complete search history.

(56) References Cited

U.S. PATENT DOCUMENTS

| | | | | |
|---|---|---|---|---|
| 5,636,861 | A  * | 6/1997 | Orsulak et al. .............. | 280/730.1 |
| 6,371,512 | B1 * | 4/2002 | Asano et al. ................. | 280/730.2 |
| 6,644,687 | B2 * | 11/2003 | Saito et al. ................... | 280/730.2 |
| 7,344,154 | B2 * | 3/2008 | Yokoyama et al. ......... | 280/743.1 |
| 7,404,570 | B2 * | 7/2008 | Miyata ........................ | 280/728.2 |
| 7,926,844 | B2 * | 4/2011 | Williams et al. ............ | 280/743.1 |
| 2002/0158457 | A1* | 10/2002 | Simmons .................... | 280/801.1 |
| 2005/0121887 | A1* | 6/2005 | Inoue et al. ................. | 280/730.2 |
| 2010/0032930 | A1* | 2/2010 | Yamamura et al. ......... | 280/730.2 |
| 2010/0101658 | A1* | 4/2010 | Stolarik et al. ............. | 137/15.01 |
| 2012/0299276 | A1* | 11/2012 | Hayashi et al. ............. | 280/730.2 |

FOREIGN PATENT DOCUMENTS

JP         2004-114829 A    4/2004

* cited by examiner

*Primary Examiner* — Ruth Ilan
*Assistant Examiner* — Darlene P Condra
(74) *Attorney, Agent, or Firm* — Posz Law Group, PLC

(57) ABSTRACT

An airbag has a lower edge of the inflation shielding section positioned lower than a belt line that is composed of the lower edge of the window at the time of the full inflation. The airbag is roll-folded such that the lower edge side thereof is wound toward the exterior side after the lower edge side thereof is folded to the exterior side, and is folded such that the lower edge-side end at the time of the full inflation is positioned on the outermost circumferential side of a roll-folding portion. While folded, the lower edge-sided end is disposed in a region where, during deployment and inflation, the lower edge-side end does not follow the inner circumferential portion of the roll-folding portion that is deployed on the inner circumferential side of the lower edge-side end, but is disposed at a position of the interior side of the inner circumferential portion.

14 Claims, 8 Drawing Sheets cross-sectional view of the reference example

HEAD PROTECTION AIRBAG APPARATUS

CROSS REFERENCE TO RELATED APPLICATIONS

The Present application claims priority from Japanese Patent Application No, 2013-225696 of Ikenohata, filed on Oct. 30, 2013, the disclosure of which is hereby incorporated into the present application by reference.

BACKGROUND OF THE INVENTION

1. Field of the Invention

The present invention relates to a head protection airbag apparatus that includes an airbag which is folded and accommodated on the upper edge side of the interior side of a window, and to attach the upper edge side at the time of a full inflation to the body side of a vehicle, in which the lower edge side of the airbag at the time of the full inflation is positioned lower than a belt line that is composed of the lower edge of the window.

2. Description of Related Art

In the related art, there is a head protection airbag apparatus that has a configuration disclosed in JP-A-2004-114829. In the head protection airbag apparatus of the related art, an airbag is folded by roll-folding to be wound from the lower edge side thereof toward the exterior side, and is accommodated on the upper edge side of a window. The roll-folding of the airbag is released in sequence, inflation is performed by an inflow of an inflation gas into the inside thereof, and the airbag is unfolded and deployed along the interior side of the window. Therefore, even when a gap between the window and an occupant's head is narrow, it is possible for the airbag to be smoothly inflated to enter the narrow gap.

However, when such a configuration is applied to an airbag that has a configuration in which the lower edge side of the fully inflated airbag is positioned lower than a belt line which is composed of the lower edge of the window, a problem arises as follows. The lower edge side of the fully inflated airbag is positioned lower than the belt line such that the holding performance for the occupant's head is secured even in a rollover. In a case of the airbag having such a configuration, when the roll-folding of the airbag is released and the airbag is deployed, the lower edge side portion interferes with a member, such as a door trim that constitutes the belt line and protrudes to the interior side from the window. Thus, it is not possible for the airbag to be smoothly inflated in some cases.

SUMMARY OF THE INVENTION

An object of the invention is to solve the above problem. There is provided a head protection airbag apparatus in which it is possible for an airbag to be smoothly deployed along a window and to be rapidly inflated, even in a case where the lower edge side of the fully inflated airbag is positioned lower than the belt line.

The object of the invention may be achieved by the head protection airbag apparatus that has following configurations.

According to an aspect of the present invention, there is provided a head protection airbag apparatus including an airbag that is folded and accommodated on the upper edge side of the interior side of a window and to attach the upper edge side at the time of full inflation to the body side of a vehicle. The airbag includes an inflation shielding section that is deployed and inflated to cover the interior side of the window by an inflow of an inflation gas therein, and is folded and accommodated by roll-folding to be wound toward the exterior side. The inflation shielding section is configured such that, when the airbag is fully inflated, the lower edge thereof is positioned lower than the belt line that is composed of the lower edge of the window. The airbag is roll-folded, after the lower edge side thereof is folded toward the interior or exterior side, and is folded such that the lower edge-side end at the time of the full inflation is positioned on the outermost circumferential side of a roll-folding portion. The airbag is folded and accommodated such that the lower edge-side end is disposed in a region where, when the roll-folding is released during deployment and inflation, the lower edge-side end does not follow the inner circumferential portion of the roll-folding portion that is deployed on the inner circumferential side of the lower edge-side end, but is disposed at a position of the interior side of the inner circumferential portion.

In the head protection airbag apparatus according to the present invention, the airbag is roll-folded to be wound toward the exterior side, after the lower edge side thereof is folded toward the interior or exterior side. The airbag is folded such that the lower edge-side end during the full inflation is disposed on the outermost circumferential side of the roll-folding portion that is wound toward the exterior side, that is, in a region where, when the roll-folding is released during deployment and inflation, the lower edge-side end is in a state of not following the inner circumferential portion of the roll-folding portion that is deployed on the inner circumferential side of the lower edge-side end, but being disposed at a position of the interior side of the inner circumferential portion. Therefore, the lower edge-side end is disposed such that the lower edge-side end does not follow the inner circumferential portion of the roll-folding portion that is deployed to be unfolded during an initial inflation of the airbag, but is deployed to release the folded state and to cover the interior side of the window, after the inner circumferential portion is substantially unfolded and deployed. As a result, in the head protection airbag apparatus according to the present invention, even though the airbag is folded by roll-folding to be wound toward the exterior side, and to position the lower edge-side end of the fully inflated airbag (the lower edge of the inflation shielding section) lower than the belt line that is composed of the lower edge of the window, it is possible to suppress interference between the lower edge side portion of the airbag and a member, such as a door trim that constitutes the belt line and protrudes to the interior side from the window using, when the roll-folding is released and the airbag is deployed. As a result, it is possible for the airbag to be rapidly deployed and to be smoothly inflated. In addition, in the head protection airbag apparatus according to the present invention, since the airbag is folded by roll-folding to be wound toward the exterior side, the airbag may be unfolded and deployed along the interior side of the window. Therefore, even in a case where a gap between the window and an occupant's head is narrow, it is possible for the airbag to be deployed to enter the narrow gap.

Thus, in the head protection airbag apparatus according to the present invention, even in a case where the lower edge side of the fully-inflated airbag is positioned lower than the belt line, it is possible for the airbag to be smoothly deployed along the window, and to be rapidly inflated.

In the head protection airbag apparatus, a configuration may be employed in which, when the airbag is folded by the roll-folding to be wound toward the exterior side, after the lower edge side thereof is folded toward the interior or exterior side, the airbag is folded and accommodated such that, in a cross section along an interior-exterior direction when the airbag is mounted on the vehicle, the lower edge-side end is disposed at a position past an intersection point between a reference line that passes the upper edge at the time of the full inflation and the center of the roll-folding portion, and the lower edge side of the inner circumferential portion of the roll-folding portion that is deployed on the inner circumferential side of the lower edge-side end when the roll-folding is released during deployment and inflation.

In the head protection airbag apparatus having such a configuration, the lower edge-side end of the fully inflated airbag may be disposed at a position past the intersection point between the reference line that passes the upper edge at the time of the full inflation and the center of the roll-folding portion and the lower end side of the inner circumferential portion of the roll-folding portion that is deployed on the inner circumferential side of the lower edge-side end when the roll-folding is released during the deployment and inflation, on the outermost circumferential side of the roll-folding portion. Therefore, the lower edge-side end does not follow the inner circumferential portion of the roll-folding portion that is deployed to be unfolded during the initial inflation of the airbag, but may maintain a state in which the lower edge-side end is disposed to the interior side of the inner circumferential portion. After the inner circumferential portion is deployed while being substantially released from the folded state, the lower edge-side end is deployed to be released from the folded state and disposed to cover the interior side of the window. Therefore, in the head protection airbag apparatus having the configuration, even though the airbag is folded by roll-folding to be wound toward the exterior side, and is configured such that the lower edge-side end (the lower edge of the inflation shielding portion) of the fully inflated airbag is positioned lower than the belt line that is composed of the lower edge of the window, it is possible to suppress the interference between the lower edge side portion and a member, such as a door trim that configures the belt line and protrudes to the interior side from the window, when the roll-folding of the airbag is released and the airbag is deployed. As a result, it is possible for the airbag to be rapidly deployed and to be smoothly inflated. In addition, in the head protection airbag apparatus having the configuration, since the airbag is folded by the roll-folding to be wound toward the exterior side, the airbag is deployed while being released from the folded state along the interior side of the window. Therefore, even in a case where the gap between the window and the occupant's head is narrow, it is possible to deploy the airbag to enter the narrow gap.

Therefore, in the head protection airbag apparatus having the above-described configuration, even in a case where the lower edge side of the fully inflated airbag is positioned lower than the belt line, it is possible for the airbag to be smoothly deployed along the window and to be rapidly inflated.

In addition, in the head protection airbag apparatus having the above-described configuration, it is preferable that the lower edge-side end be positioned on the upper side from an orthogonal reference line that passes the center of the roll-folding portion, and is substantially orthogonal to the reference line. This is because it is possible to further reliably suppress the deployment of the lower edge-side end by following the releasing of the inner circumferential portion of the roll-folding portion, during the initial inflation thereof.

Further, the head protection airbag apparatus may have a configuration as follows. The airbag may be folded by the roll-folding to be wound toward the exterior side, after the lower edge-side end thereof is folded toward the interior or exterior side. The airbag may be folded such that the lower edge side is disposed on the outermost circumferential side of the roll-folding portion, and in a cross section along the interior-exterior direction when the airbag is mounted on the vehicle, is disposed at a position past the intersection point between the vertical reference line that passes the center of the roll-folding portion and is substantially along the vertical direction, and the lower end side of the inner circumferential portion of the roll-folding portion that is deployed on the inner circumferential side of the lower edge-side end when the roll-folding is released during the deployment and inflation. Further, the lower edge-side end may be positioned on the upper side of the horizontal reference line that passes the center of the roll-folding portion and that is substantially along the horizontal direction.

In the head protection airbag apparatus having the above-described configuration, it is preferable that the upper edge side of the airbag at the time of the full inflation be folded by bellows-folding with a folding line substantially along the front-rear direction, and the outer circumferential side of the lower edge-side end be covered by a bellows-folding portion.

When the head protection airbag apparatus has the above-described configuration, it is possible to still more reliably suppress the deployment of the lower edge-side end by following the releasing of the inner circumferential portion of the roll-folding portion. In addition, since the interior side of the lower edge-side end is covered by the bellows-folding portion, and is not exposed, it is possible to suppress the interference between the lower edge-side end with a member, such as a roof head lining, when the airbag is mounted on the vehicle.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
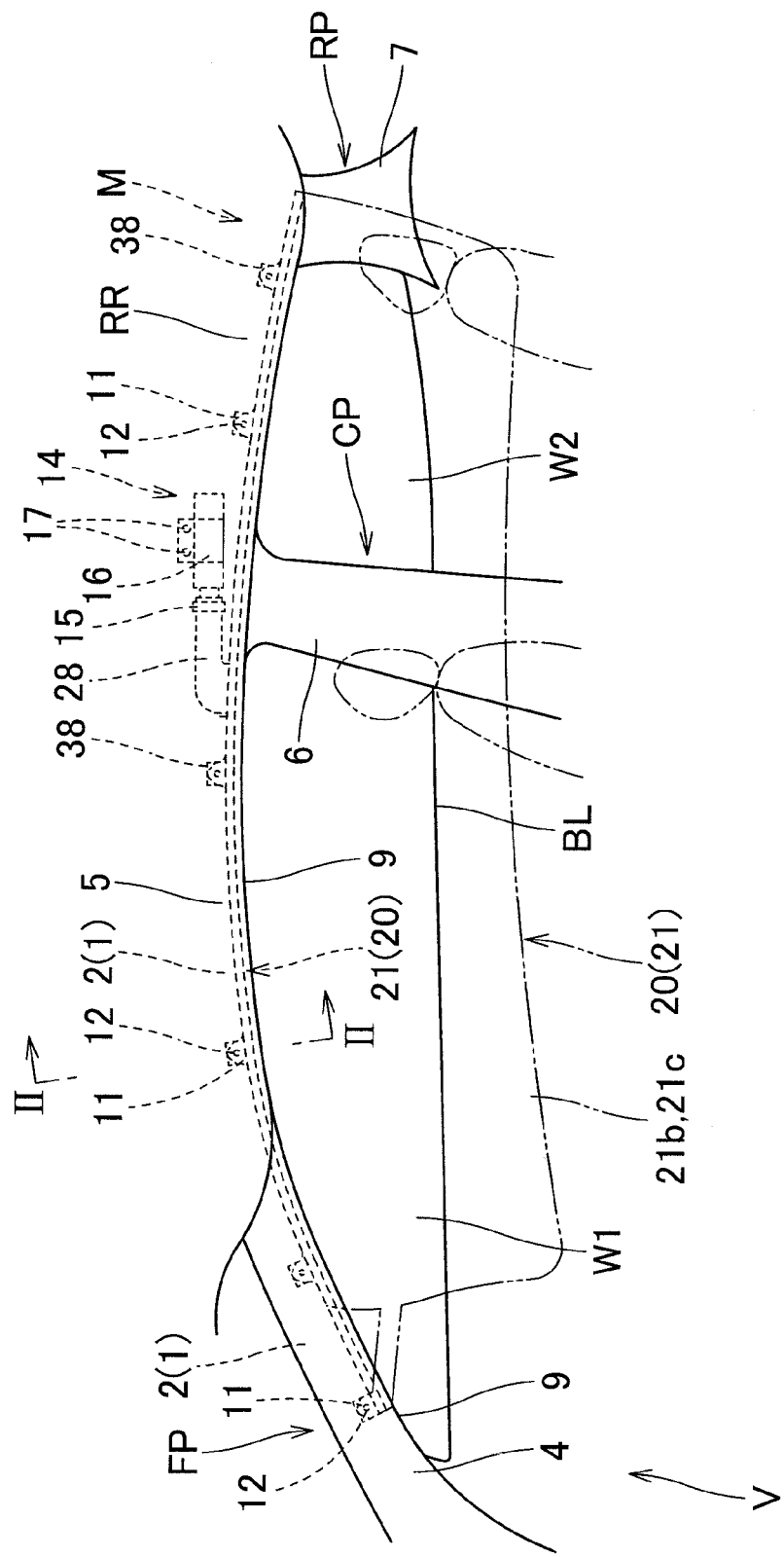
FIG. 1 is a schematic front view of the head protection airbag apparatus according to an embodiment of the invention when viewed from the interior side.

Hereinafter, an embodiment of the invention will be described with reference to the drawings. As shown in FIG. 1, a head protection airbag apparatus M according to the embodiment is mounted on a two-row seat type vehicle V that includes two windows (side windows) W1 and W2. The head protection airbag apparatus M according to the embodiment includes an airbag 20, an inflator 14, attachment brackets 11 and 16, and an airbag cover 9. The airbag 20 is folded and accommodated on the upper edge side of the windows W1 and W2 on the interior side of the vehicle V, as shown in FIG. 1. Specifically, as shown in FIG. 1, the folded airbag 20 is accommodated in a region from the lower edge side of a front pillar section FP through the lower edge side of a roof side rail portion RR to the upper side of the rear pillar section RP.

As shown in FIGS. 1, 2, 7, and 8, the airbag cover 9 is composed of the lower edges of a front pillar garnish 4 disposed in the front pillar section FP, and a roof head lining 5 disposed in the roof side rail section RR. The front pillar garnish 4 and the roof head lining 5 are made of a synthetic resin. The front pillar garnish 4 and the roof head lining 5 are mounted and fixed on the interior side I of an inner panel 2 of a body 1 (vehicle body) in the front pillar section FP and the roof side rail section RR, respectively. In addition, the airbag cover 9 covers the interior side I of the airbag 20 that is folded and accommodated, and is configured to be pushed by the airbag 20 and to be openable to the interior side I such that the airbag 20 can protrude downward on the interior side during deployment and inflation (see FIGS. 7 and 8).

The inflator 14 supplies an inflation gas to the airbag 20. The inflator 14 is substantially a columnar cylinder type, as shown in FIG. 1. A gas discharge port (not shown) that can discharge the inflation gas is provided on the leading end side of the inflator 14. The inflator 14 inserts the leading end side including the vicinity of the gas discharge port into a connection port 28, which will be described later, of the airbag 20, and is connected to the airbag 20 using a clamp 15 that is disposed on the outer circumferential side of the connection port 28. In addition, the inflator 14 is attached on the inner panel 2 using the attachment bracket 16 that holds the inflator 14 and bolts 17 for fixing the attachment bracket 16 to the inner panel 2 on the body 1 side. Specifically, the inflator 14 is disposed at a position on the upper side of a center pillar section CP (see FIG. 1). The inflator 14 is electrically connected to a controller (not shown) of the vehicle through a lead wire (not shown). The inflator 14 operates by inputting an operation signal from the controller, when the controller detects a lateral collision of the vehicle V.

Since the attachment brackets 11 are each configured of two metal plates, the respective attachment brackets 11 are attached to the respective attachment sections 38 to interpose the respective attachment sections 38 that will be described later of the airbag 20 from inside and outside. The respective attachment brackets 11 attach and fix the respective attachment sections 38 to the inner panel 2 on the body 1 side using a bolt 12 (see FIG. 2).

Figure 3:
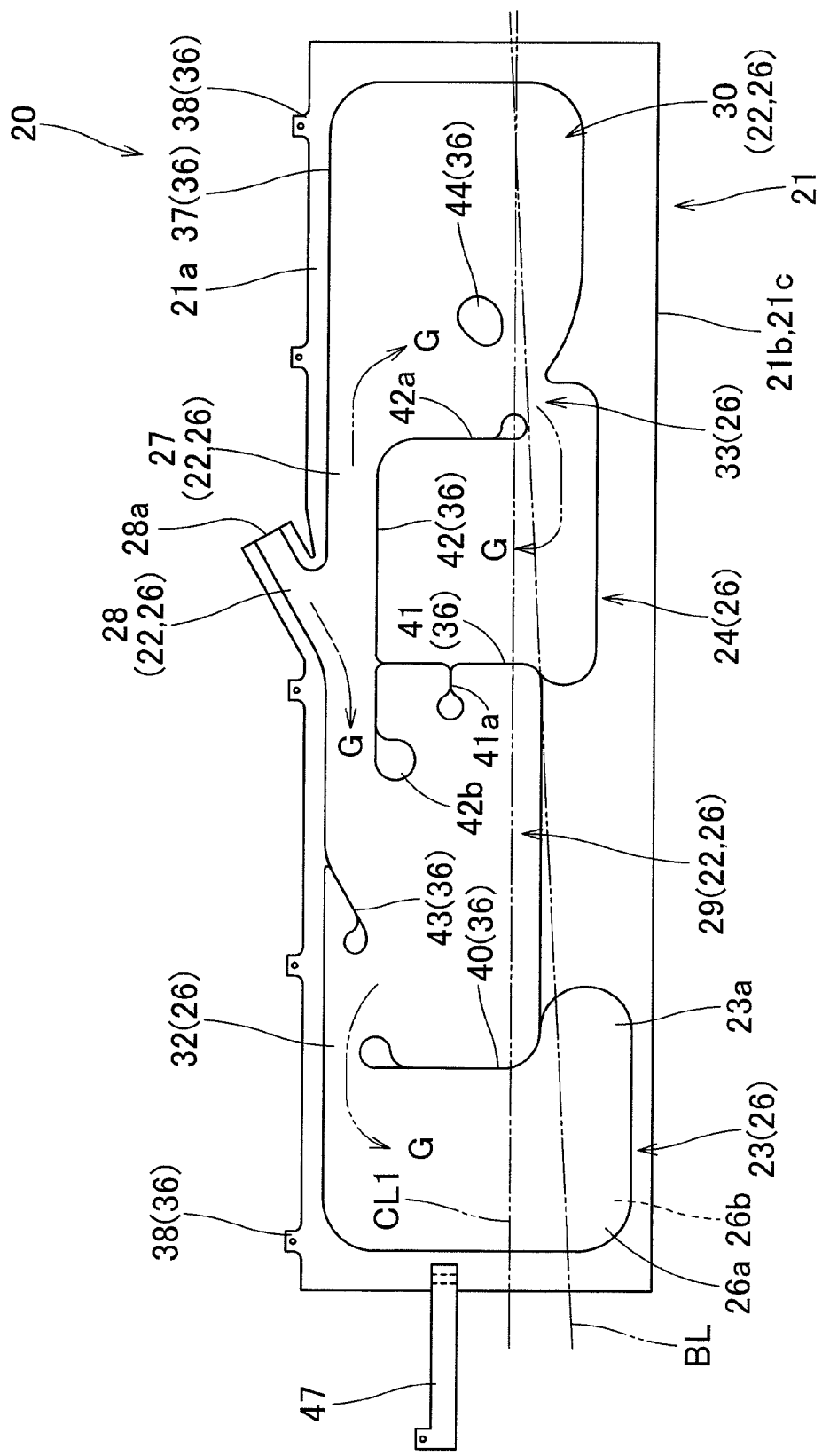
FIG. 3 is a front view of an airbag used in the head protection airbag apparatus according to the embodiment in a state in which the airbag is spread flatly.
Figure 6:
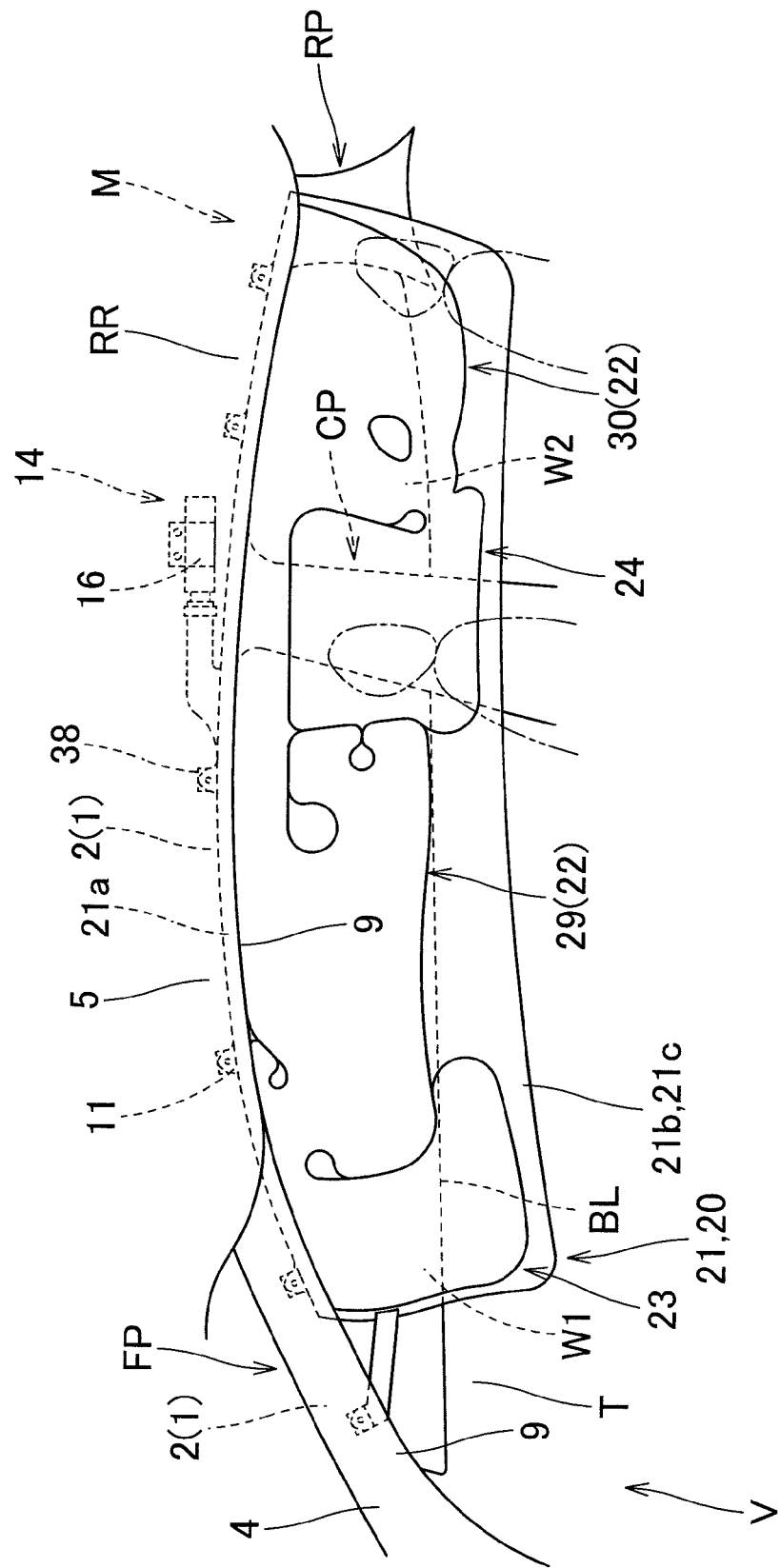
FIG. 6 is a schematic front view of the fully inflated airbag in the head protection airbag apparatus according to the embodiment when viewed from the interior side.

As shown by a two-dot chain line in FIG. 1 and FIG. 6, the airbag 20 allows the inflation gas to flow inside from the inflator 14, is deployed after being folded, and is deployed and inflated to cover the windows W1 and W2, and the interior side of a pillar garnish 6 of the center pillar section CP disposed between the windows W1 and W2, and a pillar garnish 7 of the rear pillar section RP disposed rearward from the window W2. As shown in FIG. 3, the airbag 20 includes an inflation shielding section 21 and a plurality of attachment sections 38. The inflation shielding section 21 is a portion disposed to cover the interior side of the windows W1 and W2 when the airbag is fully inflated. The attachment section 38 is a portion for attaching an upper edge 21a side of the inflation shielding section 21 to the inner panel 2 of the body 1 side.

The inflation shielding section 21 has a substantially rectangular plate-like fully inflated shape in which a longitudinal direction is substantially along the front-rear direction, and covers the interior side from the window W1 through the center pillar section CP and window W2 to the front side of the rear pillar section RP, when the airbag 20 is fully inflated. In addition, as shown in FIG. 6, the vertical width size of the inflation shielding section 21 is set such that the lower edge 21b of the fully inflated airbag is positioned lower than the belt line BL that is composed of the lower edge of the windows W1 and W2.

As shown in FIG. 3, the inflation shielding section 21 according to the embodiment includes a main inflation section 22, a front auxiliary inflation section 23, and a rear auxiliary inflation section 24. The main inflation section 22 is a portion that is inflated by the inflow of the inflation gas discharged from the inflator 14. The front auxiliary inflation section 23 and the rear auxiliary inflation section 24 are portions that are communicated with the main inflation section 22 and complete the inflation after the full inflation of the main inflation section 22. According to the embodiment, the inflation shielding section 21 is configured to be inflated by the inflow of the inflation gas G inside across substantially the entire surfaces. The main inflation section 22 that constitutes the inflation shielding section 21, the front auxiliary inflation section 23, and the rear auxiliary inflation section 24 allow the division joining sections 40 to 43 that divide the inner region thereof, and a thickness regulating section 44 to be disposed in the inner region thereof.

According to the embodiment, the airbag 20 is manufactured by stitching, using a stitching thread, two sheets of coated cloth that is coated with a coating agent against gas leakage, onto the surface of a woven fabric made of a polyimide yarn or polyester yarn. As shown in FIG. 3, the airbag 20 has a gas admissive portion 26 that admits the inflation gas G from the inflator 14 to flow inside and is inflated, and a non-admissive portion 36 where the inflow of the inflation gas is not admitted. The gas admissive portion 26 is inflated such that an interior side wall portion 26a positioned on the interior side I, when the airbag is fully inflated, is separated from an exterior side wall portion 26b positioned on the exterior side O.

The gas admissive portion 26 includes a gas guiding flow path 27, the connection port 28, a front seat protection section 29, a rear seat protection section 30 that configures the main inflation section 22 in the inflation shielding section 21; the front auxiliary inflation section 23, the rear auxiliary inflation section 24; communication sections 32 and 33 that communicate the main inflation section 22 with each of the front auxiliary inflation section 23 and rear auxiliary inflation section 24.

The gas guiding flow path 27 has a substantial rod shape that extends substantially along the front-rear direction on the upper edge 21a side of the inflation shielding section 21. The gas guiding flow path 27 is disposed to be across substantially the entire region of the main inflation section 22 from front to rear. This gas guiding flow path 27 is a portion that guides the inflation gas G discharged from the inflator 14 to the front seat protection section 29 and the rear seat protection section 30 which are disposed lower than the gas guiding flow path 27. According to the embodiment, the connection port 28 that is connected to the inflator 14 is disposed substantially at the center of the gas guiding flow path 27 from front to rear (position slightly shifted rearward substantially from the center in the front-rear direction of the inflation shielding section 21). The connection port 28 is disposed to be communicated with the gas guiding flow path 27 and to protrude upward from the gas guiding flow path 27. According to the embodiment, the connection port 28 is formed to have an upward inclination on the rear side with respect to the gas guiding flow path 27. A rear end 28a side of the connection port 28 is opened such that the inflator 14 can be inserted thereinto. The connection port 28 is connected to the inflator 14 by engaging the clamp 15 to the outer circumferential side thereof in a state in which the inflator 14 is inserted into the inside thereof.

As shown in FIG. 6, the front seat protection section 29 is disposed on the side of a front seat at the time of full inflation. The front seat protection section 29 is a portion to protect an occupant's head seated in the front seat, when the airbag 20 is fully inflated at the time of a lateral collision. According to the embodiment, when the airbag 20 is fully inflated, the lower end of the front seat protection section 29 is positioned in the vicinity of the belt line BL, and above the belt line BL (see FIG. 6). The rear seat protection section 30 is disposed on the side of the rear seat at the time of the full inflation. The rear seat protection section 30 is a portion to protect an occupant's head seated on the rear seat, when the airbag 20 is fully inflated at the time of a lateral collision. As shown in FIG. 6, the rear seat protection section 30 has a portion that extends downward from the belt line BL, when the airbag 20 is fully inflated.

The front auxiliary inflation section 23 is disposed to be adjacent to the front side of the front seat protection section 29. As shown in FIG. 6, the front auxiliary inflation section 23 extends downward from the belt line BL, at the time of the full inflation. In the front auxiliary inflation section 23, the lower end side portion 23a that is positioned lower than the belt line BL is positioned on the lower side of the front seat protection section 29, and disposed to extend downward of the front side of the front seat protection section 29. According to the embodiment, the front auxiliary inflation section 23 is communicated with the gas guiding flow path 27 through the communication section 32 that is opened on the upper rear end side. The communication section 32 has a configuration in which the width of the opening is set to be small such that an inflow of the inflation gas is further delayed than to the front seat protection section 29.

As shown in FIG. 3, the rear auxiliary inflation section 24 is disposed to cover a region on the lower side of the gas guiding flow path 27 that is between the front seat protection section 29 and the rear seat protection section 30 in the main inflation section 22. As shown in FIG. 6, the rear auxiliary inflation section 24 has a portion that extends downward from the belt line BL when the airbag 20 is fully inflated. According to the embodiment, the rear auxiliary inflation section 24 is communicated with the rear seat protection section 30 through the communication section 33 that is opened on the lower rear end side. Similarly to the communication section 32, the communication section 33 has a configuration in which the width of the opening is set to be small such that an inflow of the inflation gas is further delayed than to the rear seat protection section 30.

In the airbag 20 (inflation shielding section 21) according to the embodiment, at the time of the full inflation, as described above, the front auxiliary inflation section 23 that is disposed to cover the interior side of a region on the front side of the window W1, and the rear seat protection section 30 and the rear auxiliary inflation section 24 that are disposed to cover the interior side of the window W2 are configured such that the lower ends thereof are positioned lower than the belt line BL. According to the embodiment, a flat-deployed external appearance of the airbag 20 is substantially a rectangle in which the longitudinal direction is substantially along the front-rear direction. On the lower side of the front seat protection section 29, an extra portion that constitutes the lower side of a circumferential edge joining section 37 which will be described later is disposed to greatly extend downward. That is, in the airbag 20 according to the embodiment, the lower edge 21b of the inflation shielding section 21 is positioned lower than the belt line BL across substantially the entire region from front to rear at the time of the full inflation (see FIG. 6).

The non-admissive portion 36 includes the circumferential edge joining section 37 that constitutes the outer circumferential edge of the gas admissive portion 26, the attachment section 38 that attaches the airbag 20 to the inner panel 2, the division joining sections 40 to 43 and the thickness regulating section 44 that are disposed in the region of the gas admissive portion 26. According to the embodiment, the circumferential edge joining section 37, the division joining sections 40 to 43, and the thickness regulating section 44 are composed of a stitching portion where an interior side wall portion 26a and an exterior side wall portion 26b are stitched and fixed using the stitching yarn. A sealing agent (not shown) that prevents the gas leakage from the stitching line is applied all across the entire circumference of the stitching portion.

The circumferential edge joining section 37 is disposed to surround the entire circumference around the gas admissive portion 26 except for the rear end 28a side of the connection port 28. The attachment section 38 is a portion for attaching the upper edge 21a side of the inflation shielding section 21 to the inner panel 2 on the body 1 side of the vehicle V. A plurality of (five in the embodiment) the attachment sections 38 are disposed along the front-rear direction. An attachment hole (without the reference sign), through which a bolt 12 can be inserted, is formed on each of the attachment sections 38.

The division joining section 40 is a portion that divides the front auxiliary inflation section 23 from the front seat protection section 29. Specifically, the division joining section 40 has a substantially rod shape that is bent from a lower edge side portion in the circumferential edge joining section 37 and extends upward. The leading end of the division joining section 40 protrudes upward from the division joining section 42 that will be described later (see FIG. 3). The division joining section 41 is a portion that divides the front seat protection section 29 from the rear auxiliary inflation section 24. Specifically, the division joining section 41 has a substantially rod shape that extends upward from the lower edge side portion of the circumferential edge joining section 37. The division joining section 41 has a branch 41a that extends forward such that the branch enters a region of the front seat protection section 29 in the vicinity of the center in the vertical direction. The branch 41a is disposed to regulate the thickness of the front seat protection section 29. The division joining section 42 is a portion that constitutes the lower edge side of the gas guiding flow path 27 and that divides the rear auxiliary inflation section 24 from the gas guiding flow path 27. Specifically, the division joining section 42 is formed to extend from the upper end of the division joining section 41 in a front-rear direction. An extension portion 42a that is formed to extend downward substantially along the vertical direction is disposed on the rear end side of the division joining section 42. The extension portion 42a is a portion that divides the rear auxiliary inflation section 24 from the rear seat protection section 30. In addition, a circular division portion 42b having a substantially circular shape is disposed on the front end side of the division joining section 42. The circular division portion 42b is provided to regulate the thickness of the front seat protection section 29. The division joining section 43 is disposed at a position on the front end side of the gas guiding flow path 27 (rearward from the communication section 32), and slightly forward from the center in the front-rear direction of the front seat protection section 29. Specifically, the division joining section 43 has a substantially inclined rod shape extending from the upper edge side portion in the circumferential edge joining section 37 toward the front lower side. The leading end of the division joining section 43 is disposed at a position that is substantially equally high to the leading end of the division joining section 40 disposed on the front side. The division joining section 43 is disposed to suppress the flow of a large amount of the inflation gas to the communication section 32 side (front auxiliary inflation section 23 side), at the time of the inflation of the main inflation section 22. The thickness regulating section 44 has an external appearance which is substantially elliptical. The thickness regulating section 44 is disposed at a position in the vicinity of the lower front end of the rear seat protection section 30, and rearward from the communication section 33. The thickness regulating section 44 is provided to regulate the thickness of the rear seat protection section 30. In addition, the thickness regulating section 44 is disposed to suppress the flow of the large amount of the inflation gas to the communication section 33 side (rear auxiliary inflation section 24 side), at the time of the inflation of the main inflation section 22.

In the airbag 20 according to the embodiment, a connection belt 47 separate from the inflation shielding section 21 is provided on the front edge side of the inflation shielding section 21 (see FIG. 3). Similar to the inflation shielding section 21, the connection belt 47 is formed using the woven fabric made of the polyester yarn or the polyimide yarn. The connection belt 47 is disposed such that the proximal side is stitched and fixed to the front edge side that is slightly above the center in the vertical direction of the inflation shielding section 21 and protrudes forward. Similar to the attachment section 38, the leading end side of the connection belt 47 is attached and fixed to the inner panel 2 of the body 1 side using the attachment bracket 11 and a bolt 12. A through-hole (without a reference sign), through which the bolt 12 can be inserted, is formed on the leading end side of the connection belt 47.

Figure 4A:
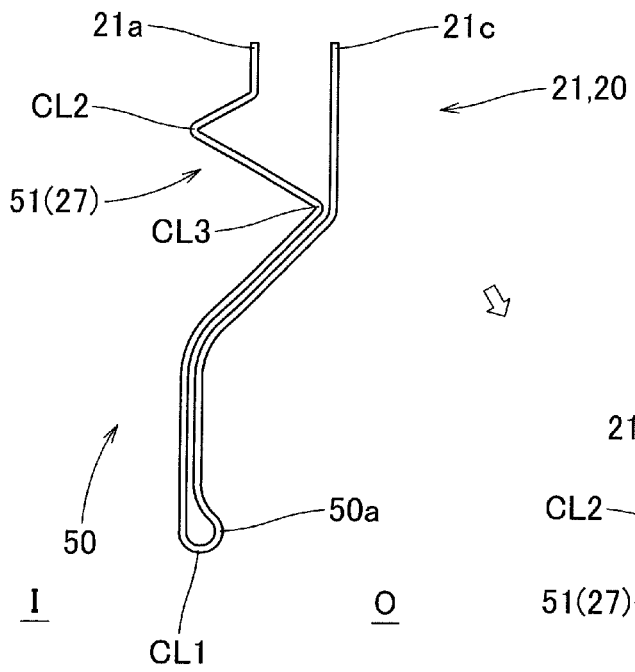
FIGS. 4A to 4C are schematic views illustrating a procedure of folding of the airbag of FIG. 3.
Figure 4B:
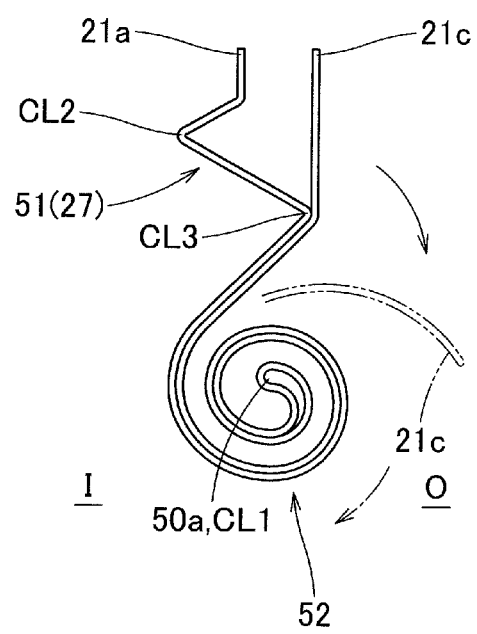
Figure 4C:
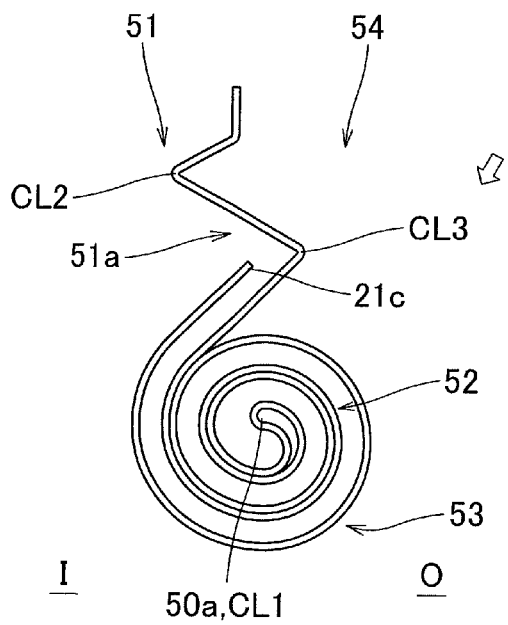
Figure 5:
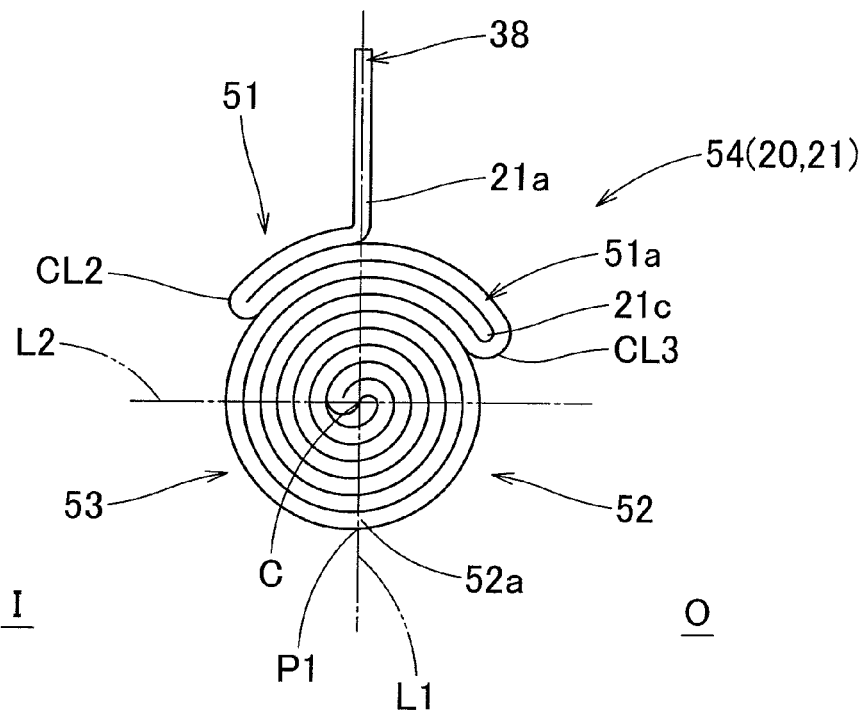
FIG. 5 is a cross-sectional view taken along an interior-exterior direction of a completely-folded body that is formed by folding of the airbag in FIG. 3.
Figure 5:
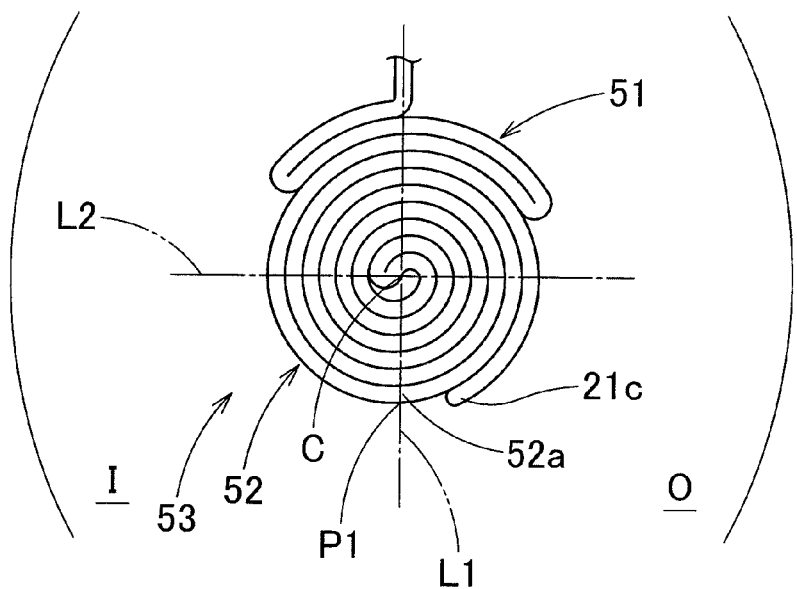

Next, mounting of the head protection airbag apparatus M according to the embodiment on the vehicle V will be described. First, the airbag 20 is folded. Specifically, the airbag 20 is folded after the interior side wall portion 26a and the exterior side wall portion 26b of the airbag is overlapped and is flatly deployed. The upper edge 21a side portion of the inflation shielding section 21 (portion of the gas guiding flow path 27) is folded in a bellows shape with a folding line put along the front-rear direction. A lower side portion from the gas guiding flow path 27 in the inflation shielding section 21 is folded by being roll-folded to be wound toward the exterior side. To be more specific, the inflation shielding section 21 with the interior side wall portion 26a and the exterior side wall portion 26b overlapped and flatly deployed is folded such that the lower edge 21b is directed toward the exterior side O with a folding line CU (see FIG. 3) along the front-rear direction at a position slightly lower than the vertical center (see in FIG. 4A). Similarly, the upper edge 21a side portion in the inflation shielding section 21 (portion of the gas guiding flow path 27) is folded in a bellows shape with two, upper and lower, folding lines CL2 and CL3 along the front-rear direction and a bellows folding portion 51 is formed. According to the embodiment, as shown in FIGS. 4 and 5, the bellows folding portion 51 is formed such that the upper folding line CL2 is positioned on the interior side I, and the lower folding line CO is positioned on the exterior side O. Subsequently, a region of about half the folded body 50 is folded by roll-folding to be wound from the lower end 50a side (folded end side) toward the exterior side O, and an inner roll section 52 is formed (see FIG. 4B). Then, a remaining portion in the folded body 50 (the lower edge 21b side portion in the inflation shielding section 21) is disposed such that the lower edge-side end 21c on the leading end side is directed toward the interior side I and covers the outer circumferential side of the inner roll section 52, and the roll-folding portion 53 is formed (see FIG. 4C). The lower edge-side end 21c on the leading end side in the roll-folding portion 53 enters the inside of a lower side portion 51a in the bellows folding portion 51 such that the outer circumferential side thereof is covered by the bellows folding portion 51. In such a way, as shown in FIG. 5, the completely-folded body 54 can be formed, and the folding of the airbag 20 is completed.

In the completely-folded body 54, as shown in FIG. 5, the lower edge-side end 21c of the inflation shielding section 21 at the time of the full inflation is disposed on the outermost circumferential side of the roll-folding portion 53. In addition, in a cross section along the interior-exterior direction, the lower edge-side end 21c is disposed at a position past an intersection point P1 between a reference line L1 that passes the upper edge 21a at the time of the full inflation and a center C of the roll-folding portion 53, and a lower end 52a side of the inner roll section 52. To be more specific, the lower edge-side end 21c is positioned on the upper side of an orthogonal reference line L2 that passes the center C of the roll-folding portion 53 and is substantially orthogonal to the reference line L1, and is disposed to enter the inside of the lower side portion 51a in the bellows folding portion 51 (see FIG. 5). The inner roll section 52 is a portion that is deployed on the inner circumferential side of the lower edge-side end 21c to be unfolded when the roll-folding is released at the time of the deployment and inflation of the airbag 20, and constitutes an inner circumferential portion of the roll-folding portion 53.

When the airbag 20 is completely folded, predetermined positions around the completely-folded body 54 are surrounded by a fold-securing wrapping material (not shown) that can be broken. Subsequently, the attachment bracket 11 is attached to each of the attachment sections 38 and the leading end of the connection belt 47. In addition, the inflator 14 is connected to the connection port 28 using the clamp 15, the attachment bracket 16 is attached around the inflator 14, and thereby an airbag assembly is formed.

Subsequently, each of the attachment brackets 11 and 16 is disposed at a predetermined position of the inner panel 2, and attached and fixed to the inner panel 2 using the bolts 12 and 17. Then, the lead wire (not shown) that extends from the controller for a predetermined inflator operation that is mounted on the vehicle V is connected to the inflator 14. Then, the front pillar garnish 4 and the roof head lining 5 that constitute the airbag cover 9 is attached to the inner panel 2 on the body 1 side. Further, when the pillar garnishes 6 and 7 are attached to the inner panel 2 on the body 1 side, the head protection airbag apparatus M can be mounted on the vehicle V.

Figure 2:
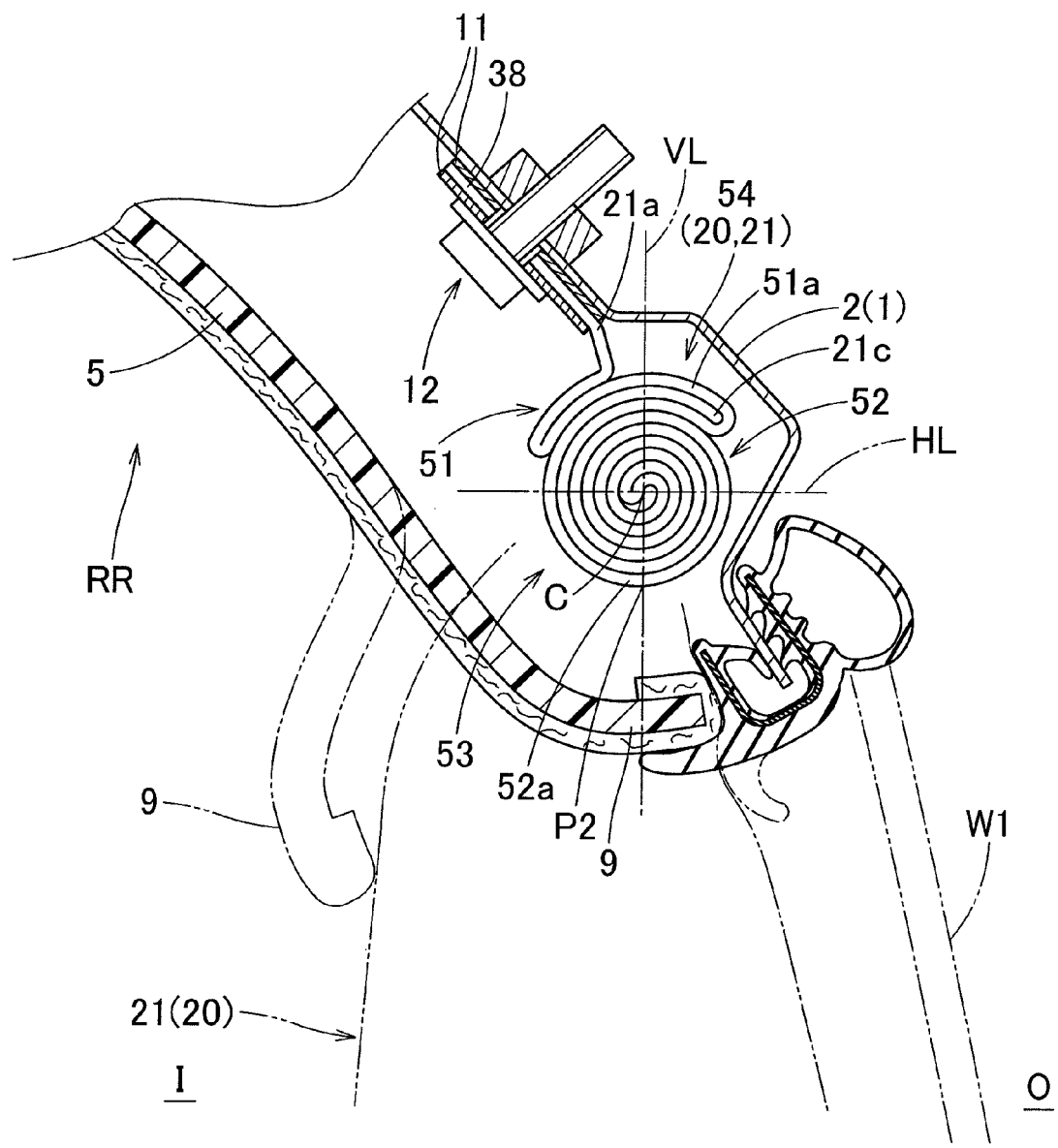
FIG. 2 is an enlarged cross-sectional view taken along line II-II in FIG. 1.

In the head protection airbag apparatus M according to the embodiment, the airbag 20 is folded and accommodated when mounted on the vehicle, such that, the lower edge-side end 21c at the time of the full inflation is disposed on the outermost circumferential side of the roll-folding portion 53, and is disposed in a region where, when the roll-folding is released during the deployment and inflation, the lower edge-side end 21c does not follow the inner circumferential portion (inner roll section 52) of the roll-folding portion 53 that is deployed on the inner circumferential side of the lower edge-side end 21c, but disposed at a position on the interior side I of the inner roll section 52. Specifically, in the airbag 20 (completely-folded body 54), in a state of being mounted on the vehicle, as shown in FIG. 2, in the cross section along the interior-exterior direction, the lower edge-side end 21c of the inflation shielding section 21 is disposed at a position past an intersection point P2 between a vertical reference line VL substantially along the vertical direction, which passes the center C of the roll-folding portion 53, and a lower end 52a side of the inner circumferential portion (inner roll section 52) of the roll-folding portion 53. To be specific, the lower edge-side end 21c is disposed on the upper side of a horizontal reference line HL that passes the center C of the roll-folding portion 53 and is substantially along the horizontal direction.

After the head protection airbag apparatus M is mounted on the vehicle V, the inflator 14 receives an operation signal from the controller and is operated at the time of the lateral collision or rollover of the vehicle V, the inflation gas G discharged from the inflator 14 flows to the inside of the inflation shielding section 21 of the airbag 20 and the inflation shielding section 21 is inflated and breaks the wrapping material (not shown). The inflation shielding section 21 that is inflated pushes and opens the airbag cover 9 that is composed of the lower edges of the front pillar garnish 4 and the roof head lining 5. Thus, the inflation shielding section 21 protrudes downward. The inflation shielding section 21 is greatly inflated such that, as shown by the two-dot chain line in FIG. 1 and FIG. 6, the lower edge 21b thereof is positioned lower than the belt line BL and covers the interior side of the windows W1 and W2, the center pillar section CP, and the rear pillar section RP.

Figure 7A:
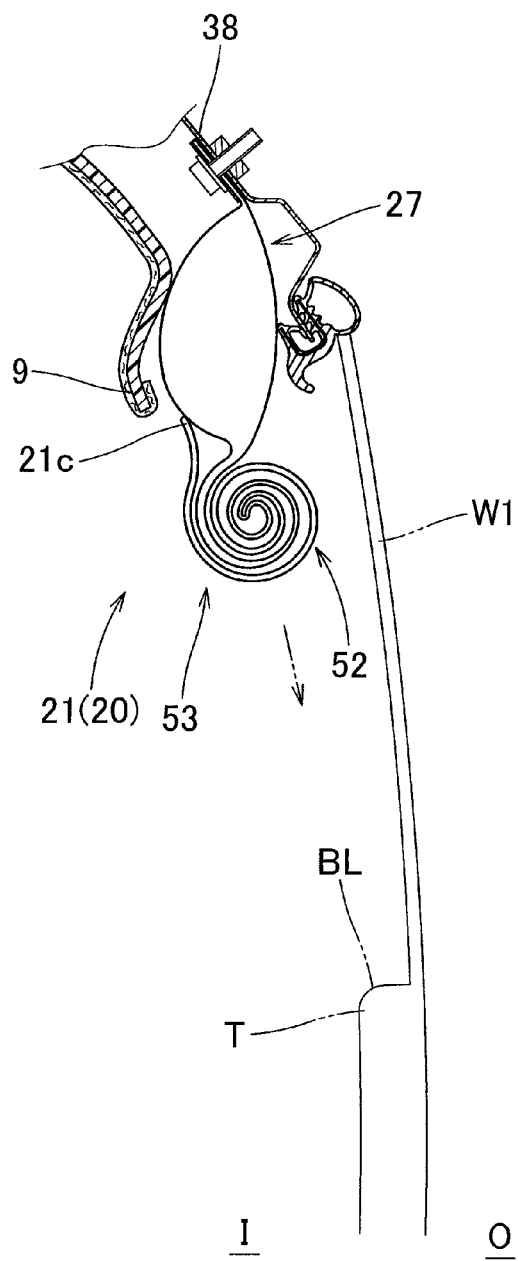
FIGS. 7A and 7B are schematic cross-sectional views illustrating a procedure of inflation of the airbag in the head protection airbag apparatus according to the embodiment.
Figure 7B:
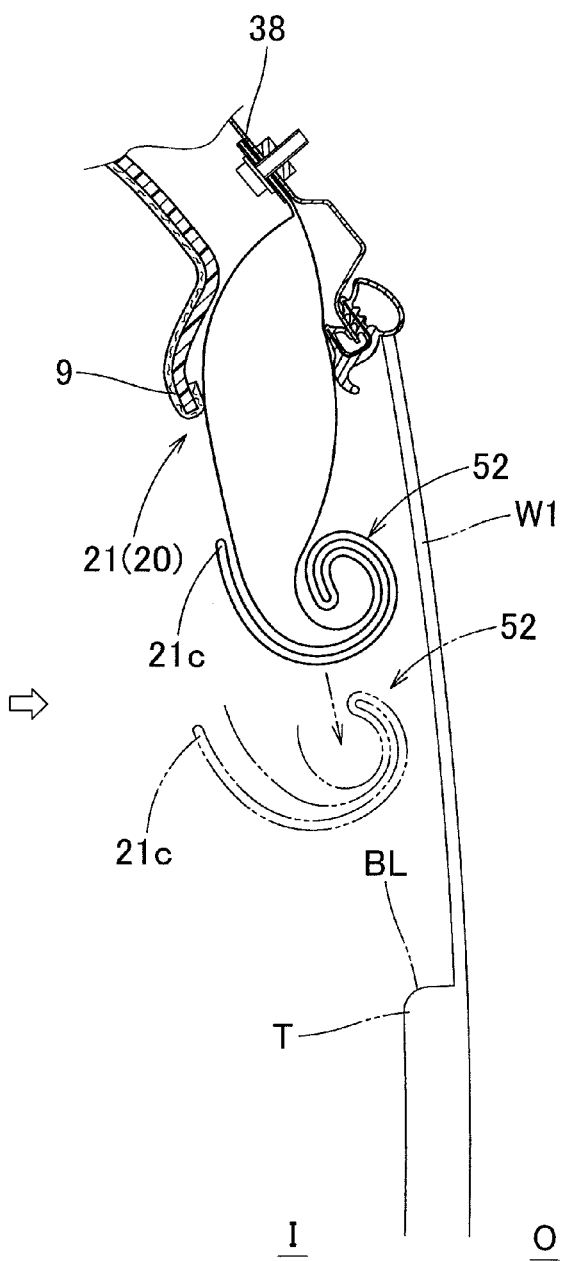
Figure 8A:
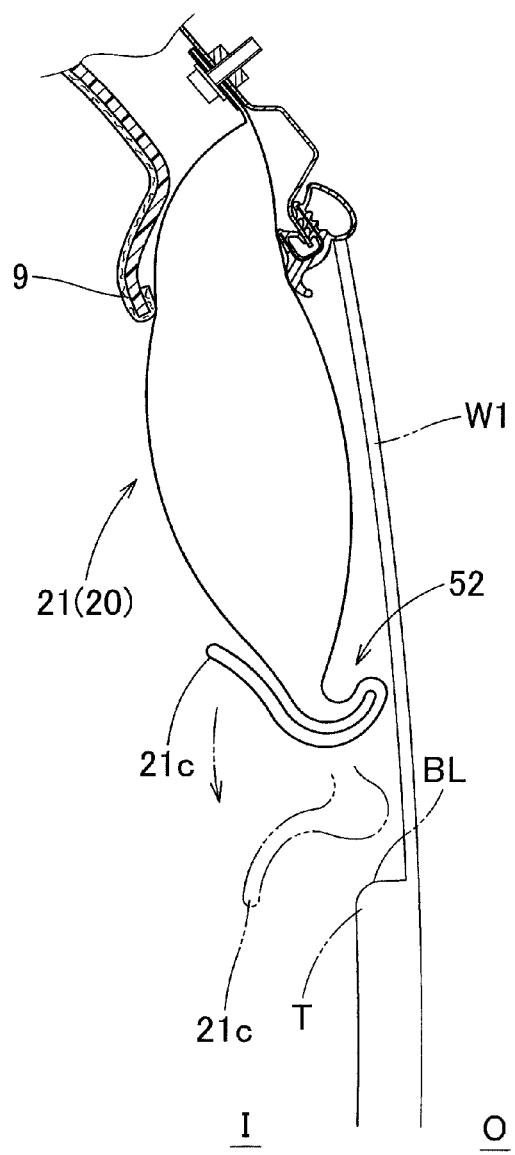
FIGS. 8A and 8B are schematic cross-sectional views illustrating a procedure of the inflation of the airbag in the head protection airbag apparatus according to the embodiment, which illustrates a subsequent procedure from FIGS. 7A and 7B.
Figure 8B:
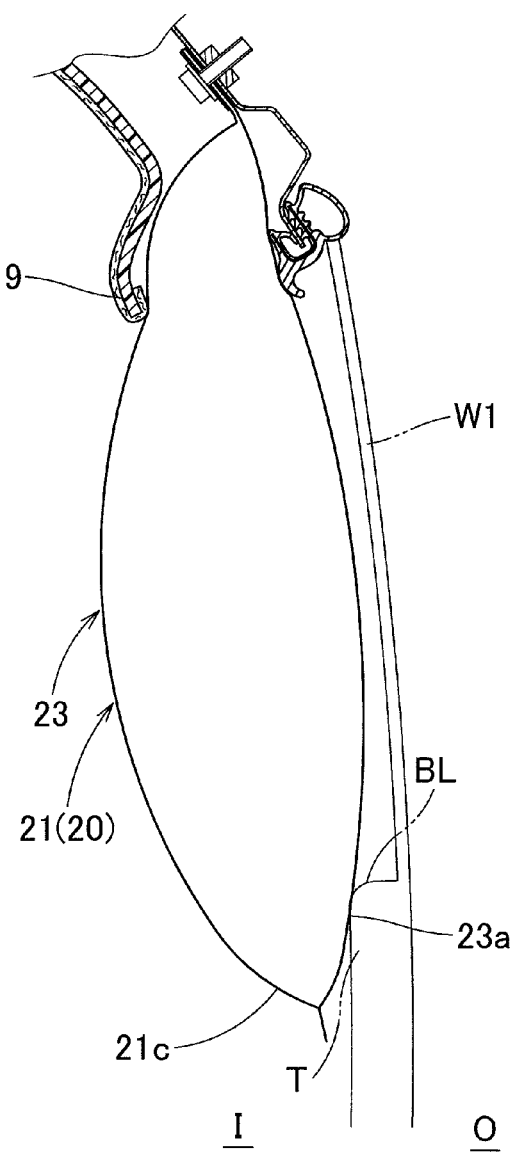

To be specific, in the head protection airbag apparatus M according to the embodiment, when the inflation shielding section 21 is inflated by the inflow of the inflation gas G into the inside thereof, first, as shown in FIG. 7A, the upper edge side bellows folding portion 51 (gas guiding flow path 27) is inflated by the inflow of the inflation gas into the inside thereof. The bellows folding portion 51 (gas guiding flow path 27) that is inflated pushes and opens the airbag cover 9 and pushes the roll-folding portion 53 downward. The pushed roll-folding portion 53 is deployed and inflated to be unfolded. At this time, the inner roll section 52 (inner circumferential portion) in the roll-folding portion 53 is deployed. At this time, the lower edge-side end 21c does not follow the inner roll section 52 but maintains a state of being disposed at a position of the interior side I of the inner roll section 52 (see FIGS. 7B and 8A). Then, after the inner roll section 52 is deployed to be unfolded, the lower edge-side end 21c is unfolded on the folding line CL1, and is deployed such that the leading end side thereof is directed downward (see two-dot chain line in FIG. 8A). As shown in FIG. 8B, the entire body of the inflation shielding section 21 is inflated to cover the interior side I of the windows W1 and W2, the center pillar section CP, and the rear pillar section RP.

In the head protection airbag apparatus M according to the embodiment, the airbag 20 is roll-folded such that the airbag 20 is wound toward the exterior side from the state that the lower edge 21b side is folded on the exterior side O. The airbag 20 is folded such that the lower edge-side end 21c at the time of the full inflation is disposed in a region on the outermost circumferential side of the roll-folding portion 53 that is configured to be wound toward the exterior side O where, when the roll-folding is released during the deployment and inflation, the lower edge-side end 21c does not follow the inner circumferential portion (inner roll section 52) of the roll-folding portion 53 that is deployed on the inner circumferential side of the lower edge-side end 21c, but is disposed at a position on the interior side I of the inner roll section 52.

In other words, in the airbag 20 according to the embodiment in a state of being folded, in the cross section along the interior-exterior direction, the lower edge-side end 21c at the time of the full inflation is disposed at a position past the intersection point P2 between the vertical reference line VL substantially along the vertical direction, which passes the center C of the roll-folding portion 53, and the lower end 52a side of the inner circumferential portion (inner roll section 52) of the roll-folding portion 53, and on the outermost circumferential side of the roll-folding portion 53. Therefore, as shown in FIGS. 7 and 8, the lower edge-side end 21c maintains, during the initial inflation of the airbag 20, a state of not following the inner roll section 52 of the roll-folding portion 53 that is deployed to be unfolded, but being disposed on the interior side I of the inner roll section 52. After the inner roll section 52 is substantially unfolded and deployed, the lower edge-side end 21c is deployed and unfolded, then the inflation shielding section 21 covers the interior side I of the windows W1 and W2.

In the head protection airbag apparatus M according to the embodiment, the airbag 20 is folded by roll-folding to be wound toward the exterior side O, and has a configuration in which the lower edge-side end 21c (lower edge 21b of the inflation shielding section 21) at the time of the full inflation is positioned lower than the belt line BL that is composed of the lower edge of the windows W1 and W2. In other words, the inflated airbag 20 has an inflation region in a region below the belt line BL. Then, even in a configuration that an inflation region is formed in a region below the belt line BL in the airbag 20, it is possible to suppress the interference between the lower edge 21b side portion with a member, such as the door trim T (see FIGS. 7 and 8) that constitutes the belt line BL and protrudes to the interior side I from the window W1, when the roll-folding of the airbag 20 is released and the airbag 20 is deployed. Therefore, it is possible for the airbag 20 to be rapidly deployed and to be smoothly inflated. In addition, in the head protection airbag apparatus M according to the embodiment, since the airbag 20 is folded by roll-folding to be wound toward the exterior side O, the airbag 20 is unfolded and deployed along the interior side of the windows W1 and W2. Therefore, even in a case where a gap between the windows W1 and W2 and the occupant's head is narrow, it is possible to deploy the airbag 20 to enter the narrow gap.

Accordingly, in the head protection airbag apparatus M according to the embodiment, even in a case where the lower edge 21b side at the time of the full inflation is positioned lower than the belt line BL, it is possible for the airbag 20 to be smoothly deployed and to be rapidly inflated along the windows W1 and W2.

In addition, in the head protection airbag apparatus M according to the embodiment, the lower edge-side end 21c is positioned on the upper side of the horizontal reference line HL substantially along the horizontal direction that passes the center C of the roll-folding portion 53. Therefore, it is possible to more reliably suppress deployment of the lower edge-side end 21c by following the unfolding of the inner roll section 52 during the initial inflation of the airbag 20.

In the head protection airbag apparatus M according to the embodiment, when mounted on the vehicle, the folded airbag 20 (completely-folded body 54) is disposed to be inclined with respect to the vertical direction such that the lower side thereof is directed toward the exterior side O, as shown in FIG. 2. However, the folded airbag 20 (completely-folded body 54) is mounted on the vehicle such that the lower edge-side end 21c is positioned on the upper side of the horizontal reference line HL past the vertical reference line VL. As a matter of course, even in a state in which the single completely-folded body 54 is disposed not to be inclined in the vertical direction, the lower edge-side end 21c is positioned on the upper side of the orthogonal reference line L2 that passes the center C of the roll-folding portion 53 and is substantially orthogonal to the reference line L1 that passes the upper edge 21a at the time of the full inflation and the center C of the roll-folding portion, past the intersection point P1 between the reference line L1 and the lower end 52a side of the inner roll portion, in the cross section along the interior-exterior direction, as shown in FIG. 5.

Further, in the head protection airbag apparatus M according to the embodiment, in the folded airbag 20 (completely-folded body 54), the outer circumferential side of the lower edge-side end 21c is covered by the bellows folding portion 51 that is formed by the upper edge 21a side at the time of the full inflation being folded in a bellows shape. Therefore, it is possible to still more reliably suppress the deployment of the lower edge-side end 21c by following the unfolding of the inner roll section 52 of the roll-folding portion 53. In addition, since the interior side I of the lower edge-side end 21c is covered by the bellows folding portion 51 and is not exposed, it is possible to suppress the interference between the lower edge-side end 21c with the member, such as a roof head lining in a state of being mounted on the vehicle V. In addition, without considering such points, a configuration may be employed, in which the airbag is folded such that the lower edge-side end does not enter the region of the bellows folding portion.

In the head protection airbag apparatus M according to the embodiment, the airbag 20 is roll-folded after the airbag 20 is flatly deployed and the lower edge 21b is folded to be directed to the exterior side O. However, the lower edge side of the airbag may be folded to be directed to the interior side. In addition, in the head protection airbag apparatus M according to the embodiment, the lower edge-side end 21c of the airbag 20 in the inflation shielding section 21 is positioned on the exterior side O past the reference line L1 and the vertical reference line VL in the completely-folded body 54 (see FIGS. 2 and 5). As long as the lower edge-side end 21c is positioned past the intersection points P1 and P2 above-described, the lower edge-side end 21c maintains a state of being disposed on the interior side i of the inner roll section 52, even when the lower edge-side end 21c is positioned on the interior side I, during the deployment and inflation of the airbag 20. Thus, it is possible to reliably prevent the lower edge-side end 21c from following the inner roll section 52 that is deployed to be unfolded. As in a reference example illustrated in parentheses of FIG. 5, in a case where the lower edge-side end 21c does not cross past the reference line L1, but is positioned on the exterior side O of the reference line L1, the lower edge-side end 21c is likely to be disposed on the exterior side of the inner roll section 52 and, thus, to follow the inner roll section 52 that is deployed, during the initial inflation of the airbag.

What is claimed is:

1. A head protection airbag apparatus comprising:
    an airbag that is adapted to be folded and accommodated on an upper edge side of an interior side of a window of a vehicle, the airbag being adapted to be attached to a body side of the vehicle by an upper edge side at full inflation of the airbag,
    wherein the airbag includes an inflation shielding section that is deployable and inflatable to cover the interior side of the window by an inflow of an inflation gas therein, and the airbag is roll-folded toward an exterior side of the airbag,
    wherein the inflation shielding section is configured such that, when the airbag is fully inflated, a lower edge of the inflation shielding section is positioned lower than a belt line of the vehicle that is composed of a lower edge of the window,
    wherein the airbag is roll-folded after the lower edge of the inflation shielding section is folded toward an interior side or the exterior side of the airbag, such that a lower edge-side end of the airbag at full inflation is positioned on an outermost circumferential side of a roll-folding portion formed by the roll-folding, and
    wherein the airbag is folded and accommodated such that the lower edge-side end is disposed in a region where, when the roll-folding unfolds during deployment and inflation, the lower edge-side end does not follow an inner circumferential portion of the roll-folding portion that unfolds on an inner circumferential side of the lower edge-side end, but is disposed at a position of an interior side of the inner circumferential portion.

2. The head protection airbag apparatus according to claim 1,
    wherein the upper edge side at full inflation of the airbag is folded by bellows-folding with a folding line extending substantially along a front-rear direction, and
    wherein a bellows-folding portion formed by the bellows-folding covers an outer circumference of the lower edge-side end.

3. A head protection airbag apparatus comprising:
    an airbag that is adapted to be folded and accommodated on an upper edge side of an interior side of a window of a vehicle, the airbag being adapted to be attached to a body side of the vehicle by an upper edge side at full inflation of the airbag,
    wherein the airbag includes an inflation shielding section that is deployable and inflatable to cover the interior side of the window by an inflow of an inflation gas therein, and the airbag is roll folded toward an exterior side of the airbag,
    wherein the inflation shielding section is configured such that, when the airbag is fully inflated, a lower edge of the inflation shielding section is positioned lower than a belt line of the vehicle that is composed of a lower edge of the window,
    wherein the airbag is roll-folded after the lower edge of the inflation shielding section is folded toward an interior side or the exterior side of the airbag, such that a lower edge-side end of the airbag at full inflation is positioned on an outermost circumferential side of a roll-folding portion formed by the roll-folding, and
    wherein the airbag is folded and accommodated such that, in a cross section along an interior-exterior direction when the airbag is mounted on the vehicle, the lower edge-side end is disposed at a position past an intersection point between a reference line that passes the upper edge at the time of the full inflation and the center of the roll-folding portion, and the lower end side of the inner circumferential portion of the roll-folding portion that is deployed on the inner circumferential side of the lower edge-side end when the roll-folding is released during deployment and inflation.

4. The head protection airbag apparatus according to claim 3,
    wherein the lower edge-side end is positioned on the upper side from an orthogonal reference line that passes the center of the roll-folding portion and is substantially orthogonal to the reference line.

5. The head protection airbag apparatus according to claim 3,
wherein the upper edge side at full inflation of the airbag is folded by bellows-folding with a folding line extending substantially along a front-rear direction, and
wherein a bellows-folding portion formed by the bellows-folding covers an outer circumference of the lower edge-side end.

6. The head protection airbag apparatus according to claim 3, wherein the lower edge-side end is located at a tail end of the airbag.

7. The head protection airbag apparatus according to claim 3, wherein the lower edge-side end is sandwiched inside a folding line.

8. The head protection airbag apparatus according to claim 3, wherein the lower edge-side end is an end that is not located in the center of the roll-folding portion.

9. A head protection airbag apparatus comprising:
an airbag that is adapted to be folded and accommodated on an upper edge side of an interior side of a window of a vehicle, the airbag being adapted to be attached to a body side of the vehicle by an upper edge side at full inflation of the airbag,
wherein the airbag includes an inflation shielding section that is deployable and inflatable to cover the interior side of the window by an inflow of an inflation gas therein, and the airbag is roll-folded toward an exterior side of the airbag,
wherein the inflation shielding section is configured such that, when the airbag is fully inflated, a lower edge of the inflation shielding section is positioned lower than a belt line of the vehicle that is composed of a lower edge of the window,
wherein the airbag is roll-folded after the lower edge of the inflation shielding section is folded toward an interior side or the exterior side of the airbag, such that a lower edge-side end of the airbag at full inflation is positioned on an outermost circumferential side of a roll-folding portion formed by the roll-folding, and
wherein the airbag is folded and accommodated such that, in a cross section along an interior-exterior direction when the airbag is mounted on the vehicle, the lower edge-side end is disposed at a position past an intersection point between a vertical reference line that passes the center of the roll-folding portion and is substantially along a vertical direction, and the lower end side of the inner circumferential portion of the roll-folding portion that is deployed on the inner circumferential side of the lower edge-side end when the roll-folding is released during deployment and inflation.

10. The head protection airbag apparatus according to claim 9,
wherein the lower edge-side end is positioned on the upper side of a horizontal reference line that passes the center of the roll-folding portion and is substantially along a horizontal direction.

11. The head protection airbag apparatus according to claim 9,
wherein the upper edge side at full inflation of the airbag is folded by bellows-folding with a folding line extending substantially along a front-rear direction, and
wherein a bellows-folding portion formed by the bellows-folding covers an outer circumference of the lower edge-side end.

12. The head protection airbag apparatus according to claim 9, wherein the lower edge-side end is located at a tail end of the airbag.

13. The head protection airbag apparatus according to claim 9, wherein the lower edge-side end is sandwiched inside a folding line.

14. The head protection airbag apparatus according to claim 9, wherein the lower edge-side end is an end that is not located in the center of the roll-folding portion.

* * * * *